United States Patent
Suzuki et al.

[11] Patent Number: 5,953,482
[45] Date of Patent: Sep. 14, 1999

[54] MAGNETIC RECORDING/REPRODUCING APPARATUS WITH THE RECORDING/REPRODUCING HEADS PRECEDING THE ERASING HEADS

[75] Inventors: Kouhei Suzuki, Takatsuki; Haruo Ohta, Hirakata; Hideaki Mukae, Sanda; Jun Takeuchi, Hirakata; Haruo Isaka, Yawata, all of Japan

[73] Assignee: Matsushita Electric Industrial Co., Ltd., Osaka, Japan

[21] Appl. No.: 08/937,303

[22] Filed: Sep. 22, 1997

Related U.S. Application Data

[63] Continuation of application No. 08/544,535, Oct. 18, 1995, abandoned.

[51] Int. Cl.⁶ ............................ H04N 5/93
[52] U.S. Cl. ............... 386/63; 360/66; 360/118
[58] Field of Search .................... 386/46, 52, 63; 360/13, 64, 66, 18, 55, 53, 118; H04N 5/93

[56] References Cited

U.S. PATENT DOCUMENTS

| | | | |
|---|---|---|---|
| 3,725,607 | 4/1973 | Angold | 360/118 |
| 4,389,680 | 6/1983 | Gramling | 386/63 |
| 4,390,915 | 6/1983 | Matsuyama | 386/63 |
| 4,737,865 | 4/1988 | Murakami et al. | 386/63 |
| 5,181,146 | 1/1993 | Koga | 360/19.1 |
| 5,187,617 | 2/1993 | Kaminaga | 360/64 |
| 5,341,248 | 8/1994 | Amada et al. | 360/33.1 |
| 5,402,271 | 3/1995 | Kaminaga et al. | 360/38.1 |
| 5,473,478 | 12/1995 | Nakashika | 360/19.1 |
| 5,488,520 | 1/1996 | Aizawa et al. | 360/77.12 |
| 5,502,603 | 3/1996 | Kohno et al. | 360/77.14 |

FOREIGN PATENT DOCUMENTS

| | | |
|---|---|---|
| 0345037 | 12/1989 | European Pat. Off. |
| 63-129502 | 6/1988 | Japan |
| 2065356 | 6/1981 | United Kingdom |

OTHER PUBLICATIONS

Patent Abstracts of Japan, vol. 009, No. 253 (P–395), Oct. 11, 1985.

*Primary Examiner*—Tommy P. Chin
*Assistant Examiner*—Y. Lee
*Attorney, Agent, or Firm*—Wenderoth, Lind & Ponack, L.L.P.

[57] ABSTRACT

A magnetic recording/reproducing apparatus is provided in which among diametrically oppositely disposed heads, a recording head and an erasing head of a same channel are disposed adjacently to each other. The recording head is disposed so as to precede by two tracks the erasing head with respect to a direction of cylinder rotation, when insert-editing, using a reproduced signal obtained by the recording head, erase and record timing setting and head tracking are performed and an erasing current is not applied during the reproduction by the recording head. The reproducing heads are disposed so as to be angularly apart by about 90 degrees from the recording and erasing heads, and a rotary transformer for reproduction is applied with a shield measure and then, formed as a core independently at an upper portion of the cylinder. In addition, more narrow tracks are compatibly reproduced by the recording head.

5 Claims, 7 Drawing Sheets

MAGNETIC RECORDING/REPRODUCING APPARATUS WITH THE RECORDING/ REPRODUCING HEADS PRECEDING THE ERASING HEADS

This application is a continuation of now abandoned application, Ser. No. 08/544,535, filed Oct. 18, 1995, now abandoned.

BACKGROUND OF THE INVENTION

1. Field of the Invention

This invention relates to a magnetic recording/reproducing apparatus for recording audio signals and video signals.

2. Description of the Prior Art

In a video tape recorder (VTR), transmission of a signal between a magnetic head and RF circuit is made through rotary transformers In general and in a business-purpose VTR or the like, the RF circuit may be carried on the cylinder. Here, the RF circuit includes a recording amplifier, a reproducing amplifier, an equalizer and the like.

In the case of business-purpose VTR, simultaneous playback function and insert-editing function are essential in order to ensure the editing performance. As a result, a recording head, a reproducing head and an erasing head are required to be disposed on the cylinder. Here, the simultaneous playback function is a function to perform recording and reproduction simultaneously, which is necessary for confirming a recorded state or performing editing.

Referring to head-arrangement, It is general to dispose a plurality of heads at equal intervals peripherally of the cylinder in order to make sure of good head-to-tape contact and easy signal processing. Here, the head-to-tape contact indicates contact condition of head and tape. Also, disposing a plurality of heads at equal intervals peripherally of the cylinder is to arrange them equlangularly on the cylinder. In this case, however, when the tape winding angle is 180 degrees, two heads in pair or Ach (channel) head and Bch head are disposed so as to make an angle of 180 degrees with each other on the cylinder or diametrically oppositely disposed thereon.

Referring to a rotary transformer construction, a crosstalk measure between channels by providing short-rings between the recording/reproducing/erasing channels is taken thereby the rotary transformer forming a core of one body type. Conventional examples shown above can be clearly seen in a commercially available business-purpose video cassette recorder (VCR), for example, a D3 standard VCR or a D5 standard VCR, or in commercially available VCR, for example, a VHS standard VCR.

Recently, down-sizing a main body of a home-use VTR and even of business-purpose one has been required. In order to meet such requirement, it is necessary to make a diameter of the cylinder small (a small cylinder) and a recording track-pitch narrow (narrow track-pitch recording). However, with a VTR of narrow track-pitch recording by the small cylinder, following problems may be arisen as:

1. With the head arrangement and the rotary transformer construction as in the conventional examples, when a recording and reproducing simultaneously, a crosstalk of recording and erasing signals to the reproduced signal is outstanding, so that the simultaneous recording and reproduction becomes difficult;
2. When editing such as insert-editing, a narrowing trackwidth due to off-tracking generally occurs at a track of one track before of an editing start track and a track of one track after of an editing finish track. Here, the narrowing track indicates that the track not to be edited is erased by erasing or overwrite recording thereby to reduce an effective trackwidth.

However, in the case of the narrow track-pitch recording, as the recording trackwidth is narrow originally, the narrowing track and the off-tracking as its cause when editing are required to be further reduced than would be made by the conventional ones, which is difficult to be attained at a conventional tracking accuracy.

3. When editing, in addition to the tracking as shown above, it is required to set an erase timing (erase starting point and erase finishing point) and a record timing (record starting point and record finishing point). Particularly, the erase timing is required to be set prior to renewal of an editing area by the recording head during head scanning.

With the VTR of narrow track-pitch recording by the small cylinder, however, the erase timing and the record timing are difficult to be set so as to satisfy the editing accuracy by applying such a conventional method that uses a PG signal from the cylinder (a rotational phase detecting signal of the cylinder), an FG signal from the motor (rotational frequency control signal of the motor), and a control signal from the linear track.

4. In order to prolong a recording time, it is general to increase a recording density or to narrow the recording track-pitch, which is being made for the home-use VTR previously. Even for the business-purpose VTR, it is required to set a long-time recording mode having narrow track-pitch other than a normal recording mode. If the recording track-pitch is narrowed in a long play mode, however, the cylinder is required to be newly provided with the head and the rotary transformer to be used for such narrowed track-pitch. The small cylinder is difficult to be additionally provided with the head and a rotary transformer channel to be used for the long play mode.

SUMMARY OF THE INVENTION

An object of this invention is to provide a magnetic recording/reproducing apparatus capable of realizing following functions with a VTR of narrow track-pitch recording by a small cylinder as: (1) a simultaneous playback function, (2) editing functions such as insert-editing and (3) a reproduction compatible function to any tape recorded in the long play mode with a different track-pitch (or, with further narrow track-pitch).

To achieve this object, a magnetic recording apparatus of this invention comprises: a rotary cylinder for winding thereon a video tape over an angle of substantially 180°; first and second recording heads mounted on the rotary cylinder at positions apart from each other by 180° in a rotating direction of the rotary cylinder for recording on the video tape first-channel and second channel video signals, respectively; and first and second erasing heads mounted on the rotary cylinder at positions apart from each other by 180° in the rotating direction of the rotary cylinder for erasing first-channel and second channel video signals, respectively recorded on the video tape, wherein the first recording head and the first erasing head are disposed adjacent to each other in the rotating direction of the rotary cylinder, and the second recording head and the second erasing head are disposed adjacent to each other in the rotating direction of the rotary cylinder.

Preferably, a magnetic recording and reproducing apparatus of this invention comprises: a rotary cylinder; a recording head mounted on the rotary cylinder; an erasing head mounted on the rotary cylinder; a reproducing head mounted on the rotary cylinder; a first rotary transformer disposed on a first core and coupled to the recording head; a second rotary transformer disposed on the first core and coupled to the erasing head; a third rotary transformer disposed on a second core and coupled to the reproducing head; and a conduct shielding member disposed between the third rotary transformer and the first and second rotary transformers.

With constructions as shown above, even with the magnetic recording and reproducing apparatus which performs narrow track-pitch recording by a small cylinder, simultaneous recording and reproduction can be attained by maximizing a distance between the reproducing head and the recording/erasing heads and at the same time, by taking such a shield measure that the rotary transformer for the reproducing head is disposed dependently at the upper portion of the cylinder. Furthermore, the erase/record timing setting and tracking when editing (particularly when insert-editing) are made possible by providing optimum arrangement of the recording/erasing heads. Besides, by reproducing function by the recording head, a reproduction compatible function to a long-time recording format recorded at a narrower track-pitch by the cylinder having a same diameter and a same lead angle can be realized.

DESCRIPTION OF THE PREFERRED EMBODIMENTS

A magnetic recording/reproducing apparatus according to an embodiment of this invention will be described on its operation when insert-editing, circuit structure in response to a simultaneous recording and reproduction, and reproduction compatible function to the long-time recording format in this order.

In this embodiment, a tape winding angle is substantially 180 degrees and a number of a recording channel is one (1), which means that it is not of the multi-channel system recording but of the one-channel system recording.

Figure 1:
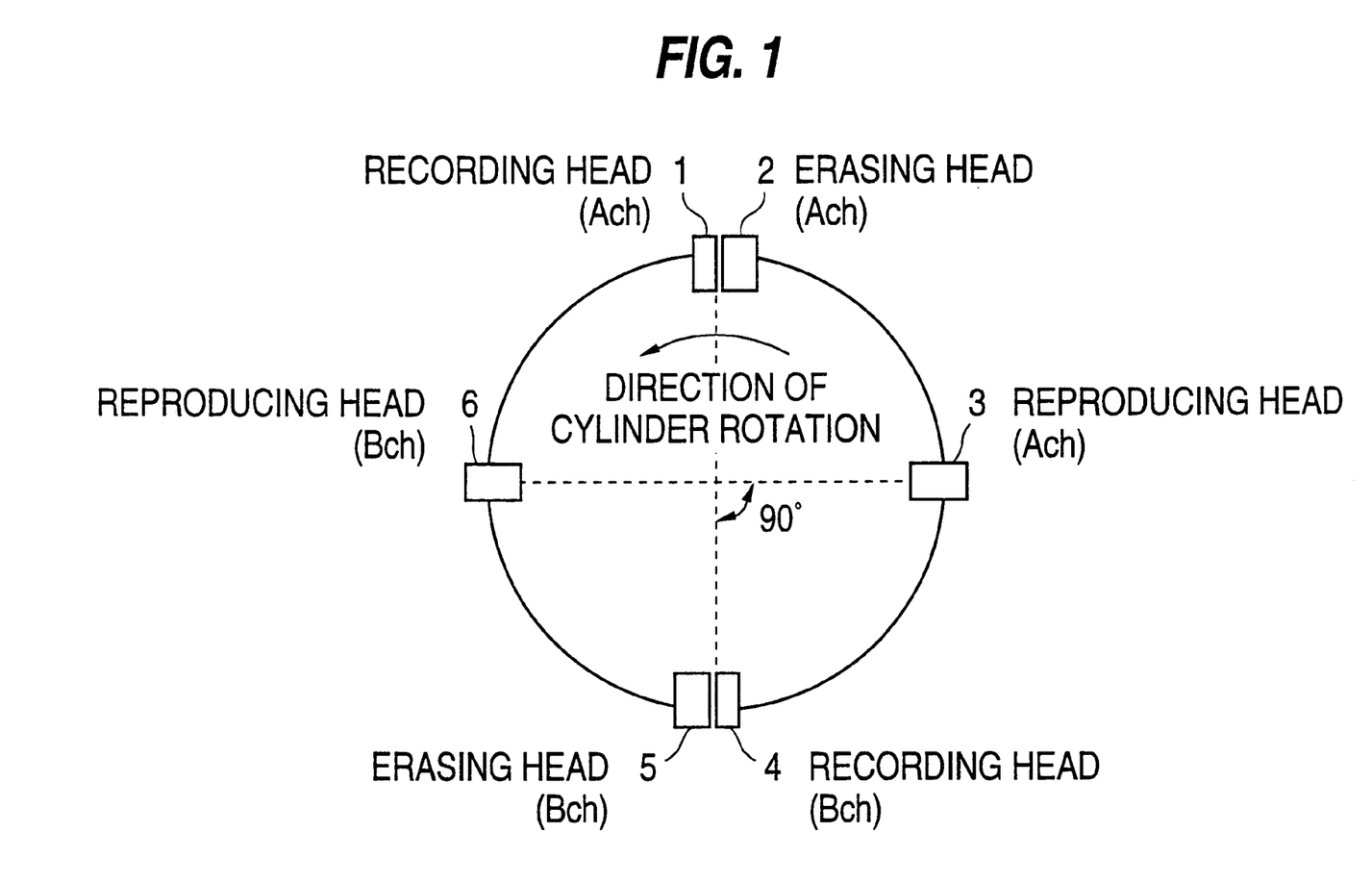
FIG. 1 is a diagram showing a head arrangement of a magnetic recording/reproducing apparatus according to an embodiment of this invention.

FIG. 1 is a diagram showing a head arrangement of a magnetic recording/reproducing apparatus of this embodiment. As shown in FIG. 1, a recording head 1 and an erasing head 2, and a recording head 4 and an erasing head 5 of a same channel are adjacently disposed to each other on a same head-base. In this case, recording heads each is disposed so as to precede a corresponding erasing head with respect to a direction of cylinder rotation. Besides, reproducing heads are disposed so as to make an angle of substantially 90 degrees respectively with adjacently disposed recording/erasing heads which are oppositely disposed so as to make an angle of 180 degrees.

Figure 2:
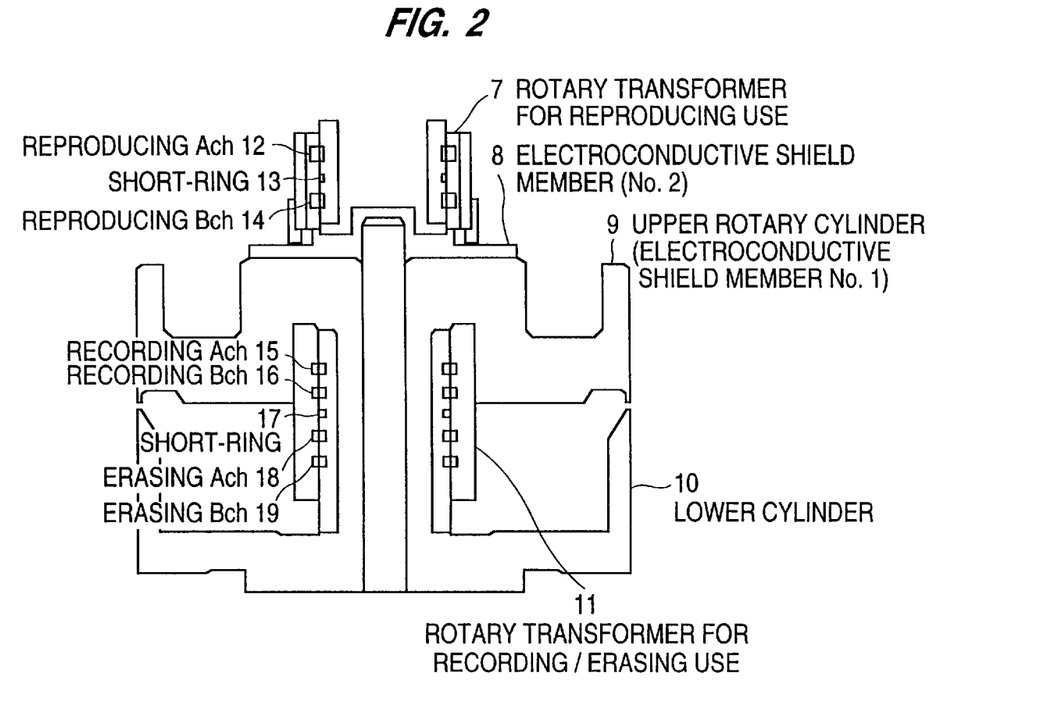
FIG. 2 is a cross-sectional diagram of a cylinder for explaining a rotary transformer construction according to the embodiment of this invention.

FIG. 2 is a cross-sectional diagram of a cylinder for explaining a rotary transformer construction of this embodiment. As shown in FIG. 2, a rotary transformer 7 for reproduction use is disposed separately from a rotary transformer 11 for recording and erasing use. Besides, between the transformers, an upper rotary cylinder 9 capable of becoming an electroconductive shield member is provided and an electroconductive shield member 8 is also provided beneath the rotary transformer 7 for reproduction use.

Figure 3:
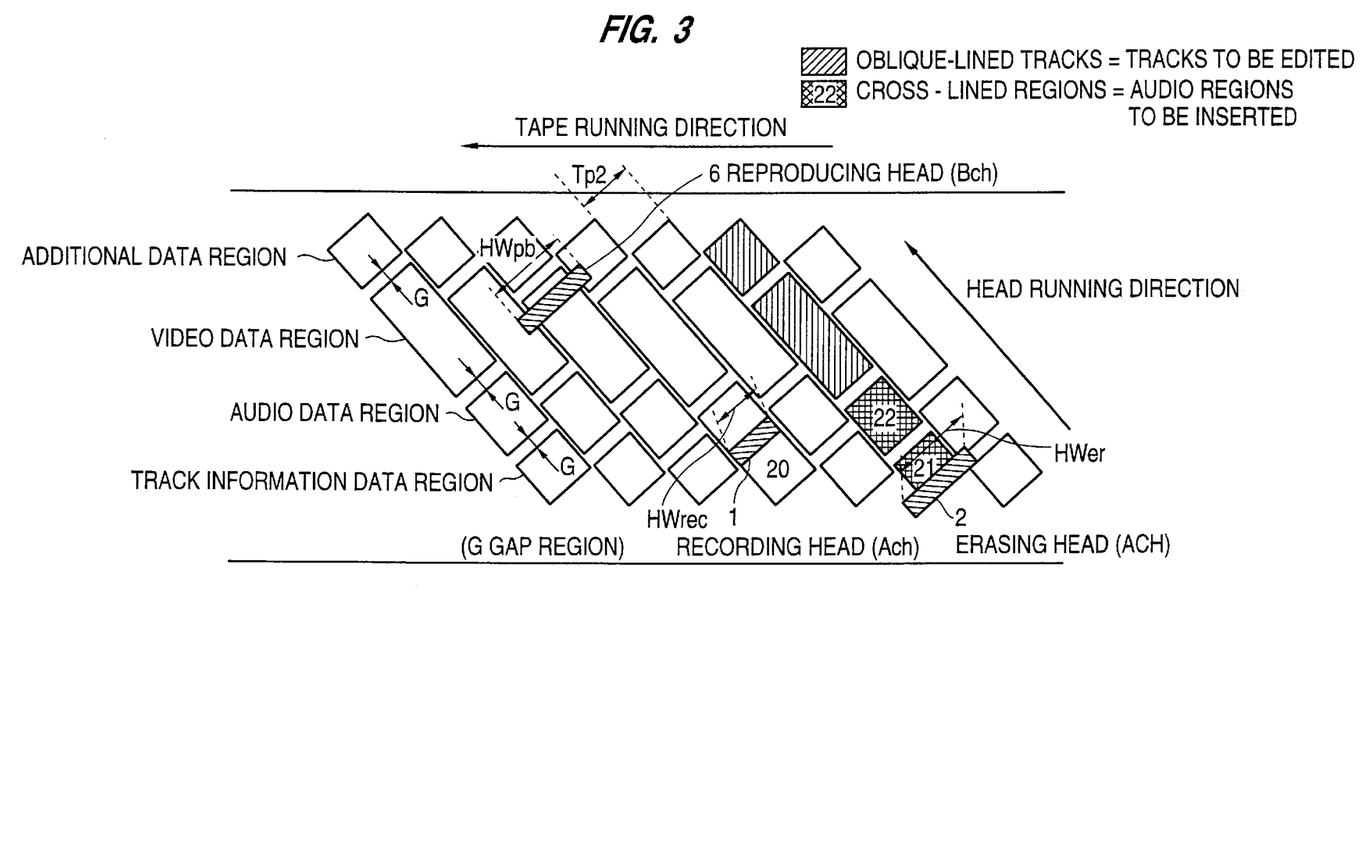
FIG. 3 is a diagram showing a helical track pattern and a head scanning according to the embodiment of this invention.

FIG. 3 is a diagram showing a helical track pattern and a head scanning pattern. As shown in FIG. 3, one helical track has four data regions consisting of a track information data region, an audio data region, a video data region and an additional data region followed by a gap region G disposed in this order from a top thereof. The track information data region includes the track information for identifying specification of a trackwidth, data for a tracking use and data for an inserting use to be used as a standard when areas where audio, video and additional data are recorded are respectively detected. The additional data region is a region where data other than audio and video data are written. The gap region G is a region that is provided for preventing the data region before and after the targeted region from being erased even after recording or during insert-editing by providing unrecording regions respectively between adjacent data regions. (Refer to "Home-use digital VTR, the present television signal standards are strengthened first", by Ide and Kanohta, Nikkei Electronics Book pp. 137–150, published on Oct. 1, 1993 from Nikkei BP Corporation.)

Next, referring to the head width of each head, track-pitch Tp2 and recording trackwidth, if the recording head width is expressed as HWrec, the reproducing head width is expressed as HWpb and the erasing head width is expressed as HWer, the relation as HWpb, HWer>Tp2≧HWrec may be obtained. Also, there does not impose particular limitation on the relation between the reproducing head width HWpb and erasing head width HWer.

Figure 4:
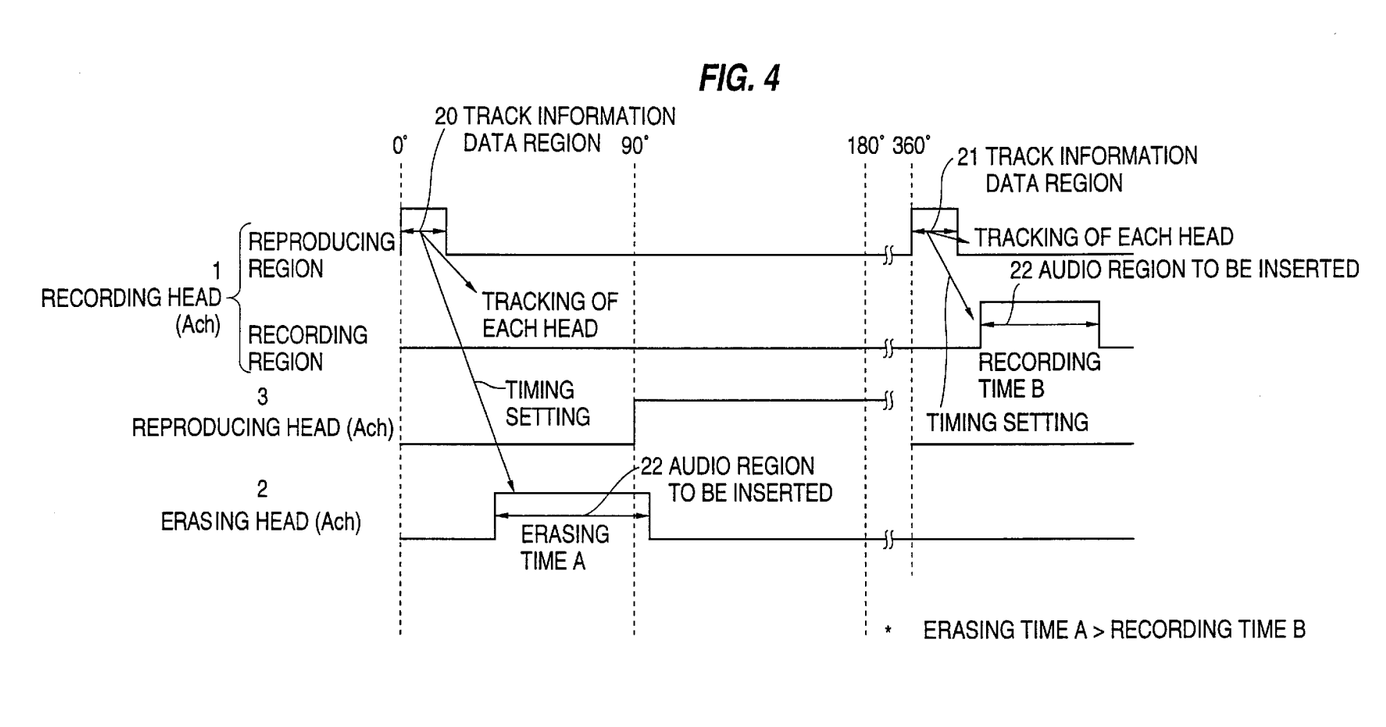
FIG. 4 is a schematic diagram showing an operational timing of each head on an Ach side when insert-editing an audio data region 22 shown in FIG. 3.

FIG. 4 is a schematic diagram showing the operational timings of each head on the Ach side when the audio data region 22 shown in FIG. 3 is insert-edited.

Figure 5:
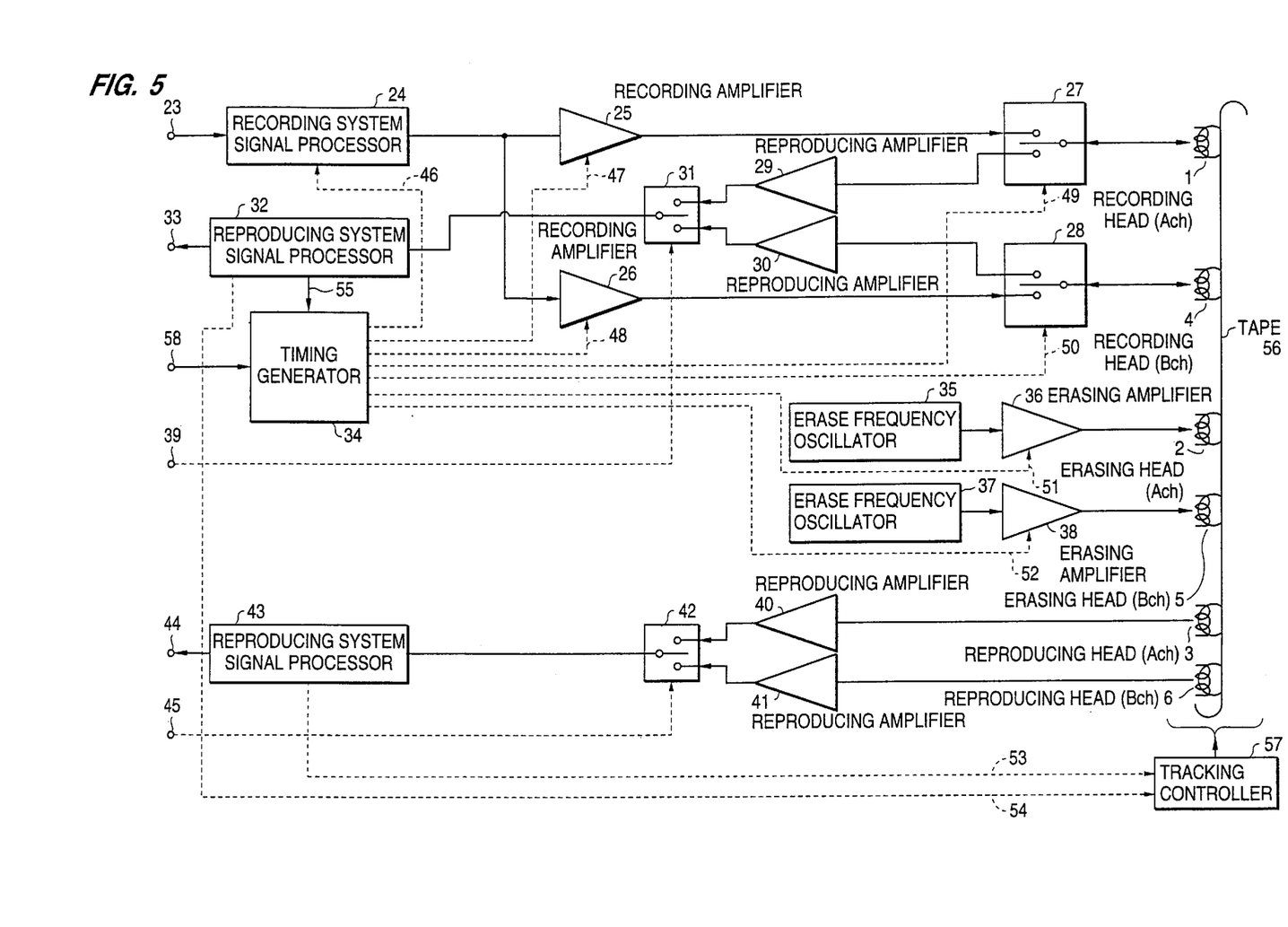
FIG. 5 is a block diagram of a magnetic recording/reproducing apparatus according to the embodiment of this invention.

FIG. 5 is a block diagram of a magnetic recording/reproducing apparatus according to this invention.

First, explanations will be made from the recording system. A recording signal is received from an input terminal 23 and supplied through a recording system signal processor 24 to a recording amplifier 25 and a recording amplifier 26. The recording system signal processor 24 converts the input signal into an optimal signal to be recorded and supplied to the recording amplifier 25 and recording amplifier 26 at a predetermined timing. The signal supplied to the recording amplifier 25 is sent through a switching circuit 27 to the recording head 1 at the desired recording timing and recorded on a tape 56. On the other hand, the signal supplied to the recording amplifier 26 is sent through a switching circuit 28 to the recording head 4 at the desired recording timing and recorded on the tape 56. The recording head 1 and the recording head 4 are used for recording in general and functional as reproducing heads, respectively, in a part of the track when editing and recording and reproducing simultaneously, or in the all tracks when compatibly reproducing the tape having recorded in the long play mode. The switching circuits 27 and 28 are for switching the recording heads 1 and 4 between recording and reproducing sides, respectively. In case that the switching circuits 27 and 28 are switched to the reproducing side, the signals are sent through a reproducing amplifier 29 and a reproducing amplifier 30 and a head switching circuit 31 to a reproducing system signal processor 32. The head switching circuit 31 is controlled by the head switching signal supplied from an input terminal 39. The reproducing system signal processor 32 processes the signal from the reproducing amplifiers to output to an output terminal 32, and during editing and simultaneous recording and reproducing operations, supplies the track information data 55 to a timing generator 34 and at the same time, supplies a control signal 54 to a tracking controller 57. The tracking controller 57 is to track each head basically by the control signal 54 generated from the reproduced signal by the recording head when recording (including editing and simultaneous recording and reproducing) and compatibly reproducing of the long play mode, and by a control signal 53 generated from the reproduced signal by the reproducing head when normally reproducing, The timing generator 34 supplies record timing signals 46, 47 and 48 to the recording system signal processor 24, the recording amplifier 25 and the recording amplifier 26, respectively, in response to the track information data single 55 and a mode identification signal received from the input terminal 58. Also, the timing generator 34 supplies the switching circuits 27 and 28 with recording/reproducing mode switching control signals 49 and 50, respectively. Furthermore, the timing generator 34 supplies the erasing amplifiers 36 and 38 with erase timing signals 51 and 52, respectively. Referring to the erasing system, erasing signals generated by erase frequency oscillators 35 and 37 are amplified by erasing amplifiers 36 and 38 and supplied to the erasing heads 2 and 3 at the desired erase timing, respectively.

Referring to the reproducing system, reproduced signals reproduced through the reproducing heads 3 and 6 from the tape 56 are supplied respectively through reproducing amplifiers 40 and 41 to a head switching circuit 42. The reproduced signal switched by a head switching signal supplied from an input terminal 45 is processed through a reproducing system signal processor 43 and supplied to an output terminal 44. Here, the reproducing system signal processor 43 supplies the control signal 53 to the tracking controller 57.

Figure 6:
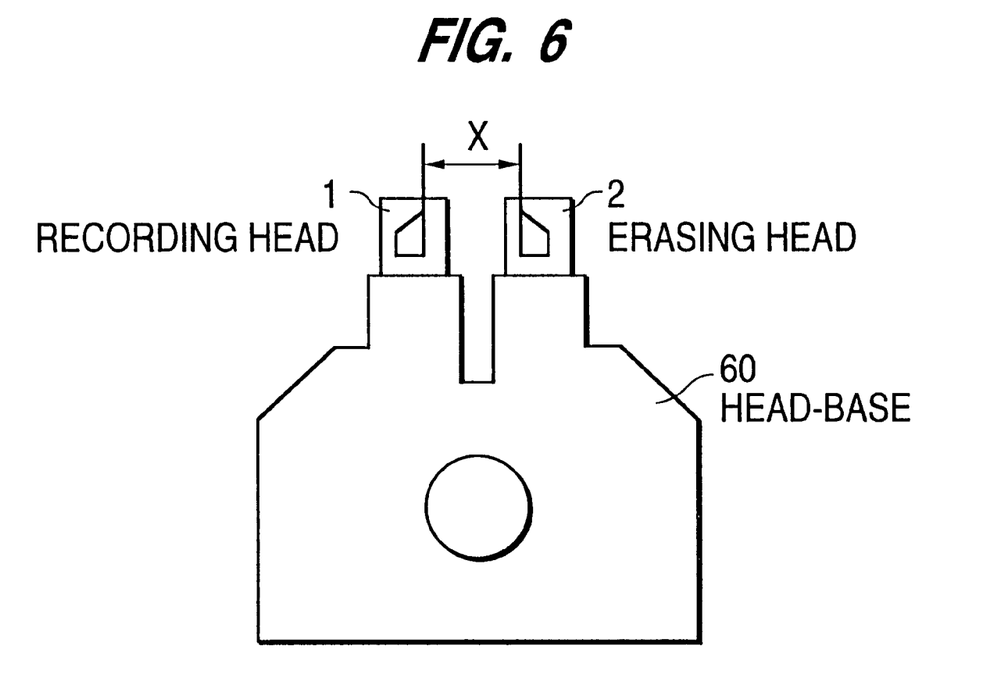
FIG. 6 is a diagram showing a head arrangement of recording heads and erasing heads looking from a direction of a cylinder rotation or a horizontal direction.

FIG. 6 is a diagram of the head arrangement of the recording head and erasing head looking from the direction of cylinder rotation, or from the horizontal direction. In FIG. 6, the recording head 1 and the erasing head 2 are disposed with a gap X therebetween on the same head base. The gap X is provided by giving consideration to the rise time of erasing current and the fact that erasing heads of the same channel (Ach) and opposite channel (Bch) both do not go into the region necessary to be erased of the helical track while the track information region at the top of the helical track is being reproduced by the recording head (for example, Ach).

Figure 7:
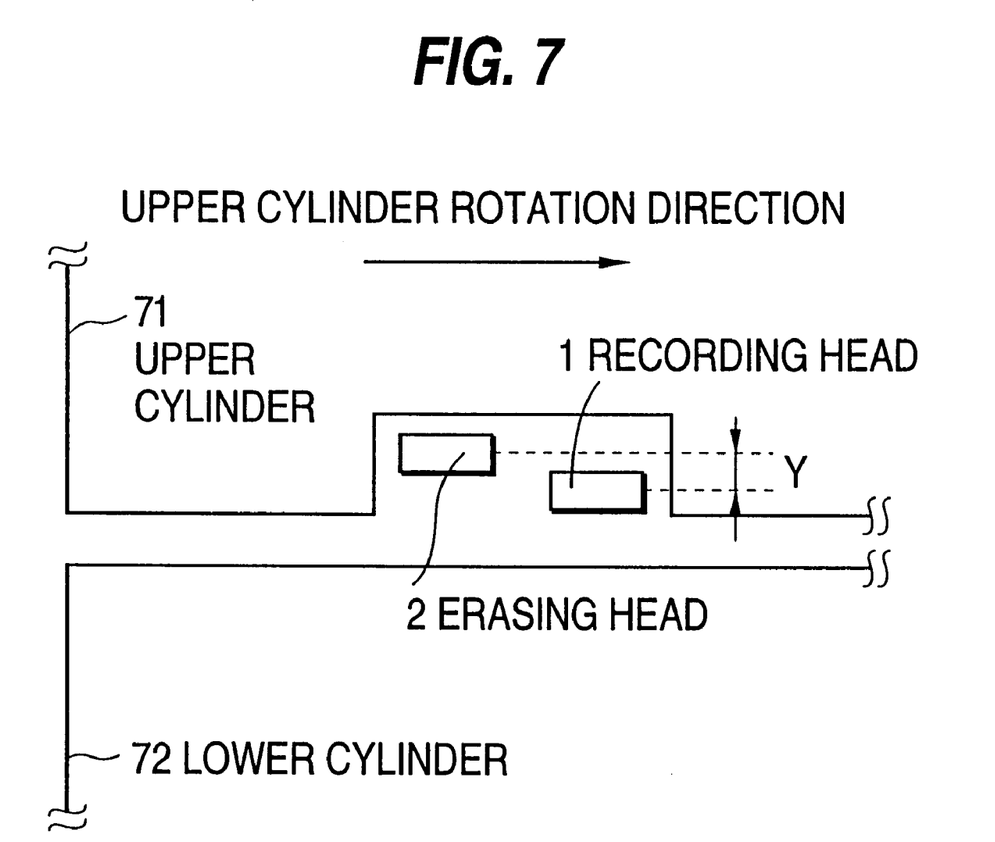
FIG. 7 is a diagram showing a head arrangement of the recording heads and the erasing heads looking from a head height direction.

FIG. 7 is a diagram of the head arrangement of the recording head and erasing head looking from the head height direction. The erasing head is disposed so as to have a relative height Y (about 2×Tp2) in order to precede by two tracks on the tape pattern to the recording head.

Next, explanations will be made on the operation when insert-editing of this embodiment, which will be made mainly on the operation of each head on the Ach side when the audio data region 22 shown in FIG. 3 is insert-edited.

When editing such as insert-editing in VTR, the erase timing and tracking are required to be decided prior to the recording. However, in the case of VTR of narrow track-pitch recording, with the conventional method using PG signal from the cylinder, FG signal from the motor and control signal from the linear track, it is difficult to set erase/record timing as well as to do tracking so as to satisfy the editing accuracy.

In the case of this embodiment, as shown in FIG. 1, the recording heads are disposed so as to precede the erasing heads with respect to the direction of cylinder rotation and, as shown in FIG. 3, the track information data region 20 of two tracks before of the erasing head 2 (namely, two tracks before of the edit-object track to be erased) is reproduced by the recording head 1 narrower in head width than the reproducing head 6 thereby to attain the erase timing setting and high accuracy tracking. In addition, the track information data region is not renewed when insert-editing.

The operation in this case is explained by referring to FIG. 5. The track information data 20 reproduced by the recording head 1 is supplied through the reproducing amplifier 29 to the reproducing system signal processing circuit 32. The reproducing system signal processing circuit 32 supplies the track information data to the timing generator 34 and the control signal 54 to the tracking controller 57. The timing generator 34 determines the erase timing of the erasing head 2 and the playback switch timing of the switching circuit 27 in response to the track information data signal. An example of the operational timing of this case is shown in FIG. 4. The erase timing setting and the tracking of this case are based on the track information data of two tracks before of the edit-object track to be erased, and the recording head 1 and the erasing head 2, as shown in FIG. 6, are adjacently disposed on the same head base 60, so that the erase timing setting and the tracking can be carried out at a high accuracy.

In addition, by preceding the erasing head by two tracks from the recording head, the track just after insert-recording can be prevented from being erased by the erasing head having wider head width. As shown in FIG. 3, the track information data region 21 of the edit-object track to be recorded is reproduced by the recording head 1, so that the recording timing setting and tracking can be carried out at a high accuracy.

Further in addition, as shown in FIGS. 3 and 4, the erasing heads are disposed and structured so as not to go into the region necessary to be erased of the helical track nor to be supplied with the erasing current, so that the crosstalk from the erasing head can be prevented during the time period when the track information data region is being reproduced by the recording head.

FIG. 4 schematically shows the operational timing of each head on the Ach side when insert-editing the audio data region 22 shown in FIG. 3, in which the erasing head 2 is not operated during reproducing the track information data region 20 by the recording head 1.

Next, the circuit construction in order to accommodate to the simultaneous recording and reproducing operations will be explained below.

As shown in FIG. 1, the reproducing head s are disposed so as to make an angle of substantially 90 degrees respectively with adjacently disposed recording/erasing heads which are oppositely disposed so as to make an angle of 180 degrees with each other. In order to reduce the crosstalk to the reproducing head on the cylinder, it is effective to take a distance from the recording head and erasing head. Particularly, in the case of using a small cylinder, it is important to take the largest possible distance between the reproducing head and recording/erasing heads. As a result, as with-the circuit construction of this embodiment, the distance from both the recording and erasing heads can be maximized by disposing the recording and erasing head so as to be adjacent to each other and the reproducing heads so as to make an angle of 90 degrees therewith.

Besides, as shown in FIG. 2, by disposing the rotary transformer 7 for the reproducing use separately from the rotary transformer 11 for the recording and erasing use, the electromagnetic coupling between the transformers can be reduced, so that the crosstalk to the reproducing system can be reduced. Also, between the transformers, the upper rotary cylinder 9 capable of becoming an electroconductive shield member is provided and the electroconductive shield member 8 is provided beneath the rotary transformer 7 for the reproducing use, so that the crosstalk between the transformers can be further reduced.

On the other hand, in case that the reproducing amplifier is not carried on the cylinder, additionally to the occurrence of the crosstalk between the transformers, inter-channel crosstalk in the rotary transformer for the reproducing use will be arisen as a problem. That is, in order to down-size the cylinder body, It is necessary to suppress the height (opposite length) of the rotary transformer, leading to a reduction in distance between channels. As a result, the separation between channels in the rotary transformer becomes unsatisfactory, so that the effect of the opposite channel (Bch) can be exercised on the channel (for example, Ach) during reproducing. Accordingly, with the rotary transformer 7 for the reproducing use shown in FIG. 2, a short-ring 13 is insertedly disposed between a reproducing channel Ach 12 and a reproducing channel Bch 14, and the crosstalk from the opposite channel can be reduced.

The short-ring is not necessary to be disposed between opposite channels because the crosstalk performance between the opposite channels w hen recording and erasing is not so required as in the case of the reproducing system. In this case, however, a short-ring 17 is necessary to be provided between the recording and erasing channels.

In addition, by disposing the rotary transformer 7 for the reproducing use at the upper portion of the rotary transformer 11 for the recording/erasing use, any effects by the motor or the like in the cylinder can be avoided, and the wiring to the reproducing amplifiers can be easily shortened. Referring to the cylinder assembling accuracy, by disposing the rotary transformer 7 for the reproducing use having a small number of channels at the upper portion thereof, the allowable accuracy of the mechanism can be reduced compared with the case of disposing the rotary transformer 11 for the recording/erasing use at the upper portion thereof.

Next, the reproduction compatible function to the long-time recording format will be explained below.

As already shown above, FIG. 3 is a diagram of VTR of a format of track-pitch Tp2 having the recording heads and reproducing heads on the cylinder. In the case of such VTR, in order to enhance the recording density of VTR having the same diameter, same lead angle and same winding angle, the recording head is employed for reproduction when reproducing the track having guardbandless recording with the long-time format of track-pitch Tp1 (Tp1<Tp2). In this case, the width of the recording head is set so as to track on the track of the track-pitch Tp1. By reproducing using the recording head having the width near the recording track-pitch (Tp1), as shown above, head impedance noise and media noise can be reduced compared with the reproduction using the reproducing head. Consequently, C/N ratio can be improved and the reproducing head and rotary transformer appropriately used for the track-pitch Tp1 can be eliminated.

As explained above, according to this embodiment, even with VTR of narrow-track-pitch recording by a small cylinder, the simultaneous recording and reproduction can be attained by maximizing the distance between the reproducing head and the recording/erasing heads and at the same time, by applying such a shield measure that the rotary transformer for the reproducing use is disposed independently at the upper portion of the cylinder. Furthermore, the erase/record timing setting and tracking when editing (particularly when insert-editing) are made possible by providing the optimum arrangement of the recording/erasing heads. Besides, with the reproducing function by the recording head, the reproduction compatible function to the long-time recording format recorded at a narrower track-pitch by the cylinder having the same diameter and same lead angle can be realized.

In addition, the tracking when reproducing normally is performed by reproducing the pilot signal superposed onto the recorded data.

Also, according to this embodiment, the rotary transformer was made of the periphery-to-periphery type (coaxial type), but not limited thereto, a face-to-face type (plane type) one may be used for this purpose.

In addition, according to this embodiment, the rotary transformer 7 for the reproducing use and the rotary transformer 11 for the recording/erasing use each does not have particular limitation upon the gap between the rotor and the stator, however, it is needless to say that if the gap in the rotary transformer 7 for the reproducing use is made larger than that in the rotary transformer 11 for the recording/erasing use, the allowable accuracy of the mechanism in assembling cylinder can be further reduced.

Further in addition, according to this embodiment, the short-ring 13 was inserted into the rotary transformer 7 for the reproducing use, but not limited thereto, it is needless to say that if the inter-channel crosstalk can be held without inserting the short-ring in the transformer having an equivalent or less-opposite length, the short-ring does not need to be used.

Besides, according to this embodiment, the number of recording channels was made one (1), but not limited thereto, it is needless to say that if the number of recording channels is made N (N>1), the same effect can be obtained.

Also, according to this embodiment, it is needless to say that the same effect can be obtained even with an analog recording VTR or digital recording VTR.

In addition, according to this embodiment, referring to the crosstalk to the reproducing system, the crosstalks from the recording and erasing channels were suppressed to the same level, however, if the erase frequency is set to be out of the frequency bandwidth of reproduced signal, the crosstalk allowance from the erasing channels becomes large. As a result, in the rotary transformer 11 for the recording/erasing use, the erasing channels (erase Ach 18, erase Bch 19) and the recording channels (record Ach 15, record Bch 16) can exchange their positions with each other.

What is claimed is:

1. A magnetic recording apparatus comprising:

a rotary cylinder for winding thereon a video tape over an angle of substantially 180°;

first and second recording/reproducing heads mounted on the rotary cylinder at positions apart from each other by 180° in a rotating direction of the rotary cylinder for recording on the video tape first-channel and second channel video signals, respectively, and for reproducing track information from the video tape during an editing mode; and first and second erasing heads mounted on the rotary cylinder at positions apart from each other by 180° in the rotating direction of the rotary cylinder for erasing first-channel and second channel video signals, respectively, recorded on the video tape, wherein the first recording/reproducing head and the first erasing head are disposed adjacent to each other in the rotating direction of the rotary cylinder, and the second recording/reproducing head and the second erasing head are disposed adjacent to each other in the rotating direction of the rotary cylinder, and wherein the first and second recording/reproducing heads are disposed on the rotary cylinder so as to precede the first and second erasing heads, respectively, in the rotating direction of the rotary cylinder, and the first and second erasing heads are disposed to be higher in a head height direction, respectively, than the first and second recording/reproducing heads such that the first and second erasing heads scan tracks which precede in a running direction of the video tape by two tracks from respective tracks recorded by the first and second recording/reproducing heads.

2. The magnetic recording apparatus according to claim 1, which scans plural helical tracks on a magnetic recording medium, each of the plural helical tracks comprising a plurality of data regions and gap regions between the data regions, the data regions including a track information data region located at a beginning end of the helical track for recording positions of head tracking and the data regions, wherein, during the editing mode, the first and second erasing heads erase tracks which precede in a running direction of the magnetic recording medium by two tracks from respective tracks recorded by the first and second recording/reproducing heads and wherein the first and second recording/reproducing heads are disposed on the rotary cylinder to precede the first and second erasing heads, respectively, in the rotating direction of the rotary cylinder such that the first and second erasing heads do not scan a region necessary to be erased while the recording/reproducing heads scan the track information data region.

3. The magnetic recording apparatus according to claim 2, further comprising first control means, wherein when editing, the first control means controls the first and second recording/reproducing heads so that track information data on the track information data region are reproduced to generate a reproduced signal, and using said reproduced signal, an erase timing of the first and second erasing heads and a record timing of the first and second recording/reproducing heads are set.

4. The magnetic recording apparatus according to claim 3, further comprising second control means for stopping an erasing current applied to the first and second erasing heads while the track information data are being reproduced by one of the first and second recording/reproducing heads.

5. A magnetic recording apparatus comprising:

a rotary cylinder for winding thereon a video tape over an angle of substantially 180°;

first and second recording/reproducing heads mounted on the rotary cylinder at positions apart from each other by 180° in a rotating direction of the rotary cylinder for recording on the video tape first-channel and second channel video signals, respectively, and for reproducing track information from the video tape during an editing mode;

first and second erasing heads mounted on the rotary cylinder at positions apart from each other by 180° in the rotating direction of the rotary cylinder for erasing first-channel and second channel video signals, respectively, recorded on the video tape; and first and second reproducing heads mounted on the rotary cylinder at positions apart from each other by 180° in the rotating direction of the rotary cylinder for reproducing from the video tape the first-channel and second channel video signals, respectively, wherein the first recording/reproducing head and the first erasing head are disposed adjacent to each other in the rotating direction of the rotary cylinder, the second recording/reproducing head and the second erasing head are disposed adjacent to each other in the rotating direction of the rotary cylinder, the first recording/ reproducing head and the first reproducing head are disposed at positions apart from each other by substantially 90° in the rotating direction of the rotary cylinder, and the second recording/reproducing head and the second reproducing head are disposed at positions apart from each other by substantially 90° in the rotating direction of the rotary cylinder, and wherein the first and second recording/reproducing heads are disposed on the rotary cylinder so as to precede the first and second erasing heads, respectively, in the rotating direction of the rotary cylinder, and the first and second erasing heads are disposed to be higher in a head height direction, respectively, than the first and second recording/reproducing heads such that the first and second erasing heads scan tracks which precede in a running direction of the video tape by two tracks from respective tracks recorded by the first and second recording/reproducing heads.

* * * * *